United States Patent
Ikegawa

(10) Patent No.: US 7,653,217 B2
(45) Date of Patent: Jan. 26, 2010

(54) IMAGE DATA PROCESSING APPARATUS AND METHOD USING ATTRIBUTE INFORMATION

(75) Inventor: Yoshiharu Ikegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 11/253,736

(22) Filed: Oct. 20, 2005

(65) Prior Publication Data

US 2006/0087709 A1    Apr. 27, 2006

(30) Foreign Application Priority Data

Oct. 25, 2004    (JP)    ............... 2004-309874

(51) Int. Cl.
  *G06K 9/00*    (2006.01)
(52) U.S. Cl. .................................... 382/112
(58) Field of Classification Search ............... 358/1.1, 358/1.9, 500, 505, 515; 382/100, 112, 162–167, 382/232, 251, 173–176; 348/169–172
See application file for complete search history.

(56) References Cited

U.S. PATENT DOCUMENTS

| 6,556,210 | B1 * | 4/2003 | Yamamoto et al. ......... 345/582 |
| 7,218,420 | B1 * | 5/2007 | Tai et al. ................... 358/3.2 |
| 2002/0051230 | A1 | 5/2002 | Ohta ......................... 358/448 |
| 2003/0016390 | A1 * | 1/2003 | Yuasa ........................ 358/1.16 |
| 2004/0179237 | A1 * | 9/2004 | Takenaka et al. ........... 358/2.1 |
| 2006/0067589 | A1 * | 3/2006 | Perlmutter et al. .......... 382/276 |

FOREIGN PATENT DOCUMENTS

JP    9-282471    10/1997

* cited by examiner

Primary Examiner—Samir A. Ahmed
Assistant Examiner—Atiba O Fitzpatrick
(74) Attorney, Agent, or Firm—Fitzpatrick, Cella, Harper & Scinto

(57) ABSTRACT

An image processing apparatus for processing image data having attribute information for every pixel of the image data, includes a combining unit that combines component image data, which corresponds to each of a plurality of component images, into composite image data that corresponds to a single composite image, and an attribute appending unit that appends identification information, which indicates the component image data to which each pixel belongs, as attribute information of pixels of the composite image data. In addition, a processing unit applies common image processing to pixels having identical values as the identification information based on the attribute information.

9 Claims, 17 Drawing Sheets

FIG. 9

| bit | DESCRIPTION | VALUE | |
|---|---|---|---|
| | | 0 | 1 |
| 7 | reserve | — | — |
| 6 | reserve | — | — |
| 5 | reserve | — | — |
| 4 | reserve | — | — |
| 3 | COPY/PDL CHANGEOVER | COPY IMAGE | PDL IMAGE |
| 2 | ACHROMATIC COLOR CHANGEOVER | CHROMATIC COLOR | ACHROMATIC COLOR |
| 1 | TEXT/PHOTOGRAPH CHANGEOVER | PHOTOGRAPH | TEXT |
| 0 | VECTOR | OTHER THAN VECTOR | VECTOR |

FIG. 10

| bit | DESCRIPTION | VALUE | |
|---|---|---|---|
| | | 0 | 1 |
| 7 | reserve | — | — |
| 6 | reserve | — | — |
| 5 | reserve | — | — |
| 4 | reserve | — | — |
| 3 | COPY/PDL CHANGEOVER | COPY IMAGE | PDL IMAGE |
| 2 | ACHROMATIC COLOR CHANGEOVER | CHROMATIC COLOR | ACHROMATIC COLOR |
| 1 | TEXT/PHOTOGRAPH CHANGEOVER | PHOTOGRAPH | TEXT |
| 0 | reserve | — | — |

FIG. 11

| bit | DESCRIPTION | VALUE | |
|---|---|---|---|
| | | 0 | 1 |
| 7 | IMAGE NO. | IMAGE NO | — |
| 6 | | | |
| 5 | MODE CHANGEOVER | NON-PRINTING PAPER | PRINTING PAPER |
| 4 | reserve | — | — |
| 3 | COPY/PDL CHANGEOVER | COPY IMAGE | PDL IMAGE |
| 2 | ACHROMATIC COLOR CHANGEOVER | CHROMATIC COLOR | ACHROMATIC COLOR |
| 1 | TEXT/PHOTOGRAPH CHANGEOVER | PHOTOGRAPH | TEXT |
| 0 | reserve | — | — |

IMAGE DATA PROCESSING APPARATUS AND METHOD USING ATTRIBUTE INFORMATION

FIELD OF THE INVENTION

This invention relates to an image processing apparatus and method for appending attribute information, which conforms to an image characteristic of image data, to the image data, and executing image processing in accordance with the appended attribute information.

BACKGROUND OF THE INVENTION

There are digital copiers that append attribute information for every pixel of image data and execute image processing in accordance with this attribute information. For example, a text/image flag and chromatic color/achromatic color flag are appended as attribute information to a copy image that has been read in by a scanner or the like. Alternatively, a mode is switched between a photographic paper mode or a non-photographic paper mode on a per-page basis in accordance with the operating mode of read-in processing and is appended as an attribute. Further, a text/image flag, chromatic color/achromatic color flag and vector flag, etc., are appended as attribute information to PDL data that is input from a computer, by way of example.

In image processing, an improvement in image quality is achieved by changing over the processing method of the image processing based upon such attribute information. For example, color printing and monochrome printing are switched between in accordance with the chromatic color/achromatic color attribute, which is one item of attribute information, and halftone processing is switched between the error diffusion method and screen method based upon the text/image flag [see Japanese Patent Application Laid-Open No. 09-282471 (Patent Reference 1)].

A digital copier has an N-in-1 copying function for reducing the size of an image read in by a scanner, fitting a plurality of images on a single page and printing out the images on a single page. (If paper of large size is used, this function can be implemented without reducing image size. In this specification, however, the function will be referred to as "N-in-1 copying" for the sake of convenience). In a case where the N-in-1 copying function is used, a problem which arises is that the appropriate processing cannot be applied for each and every image read in. For example, consider the execution of processing for an automatic color/monochrome decision (a function for determining whether a color image to be copied contains a color component other than black, and appending an achromatic color attribute if it is determined that the image does not contain a component other than black) or for automatic under-color removal (a function for removing the under-color of a document) when a copy is to be made. If image processing such as the automatic color/monochrome decision or automatic under-color removal is executed after a plurality of images are read in and the images combined as images formed on a single sheet of paper, the automatic color/monochrome decision or automatic under-color removal will be executed per page on which the plurality of read images have been made to fit. Since there is the possibility that there will be a disparity in whether an image is monochrome or color or in the under-color for every page of the document that has been read in, it is also possible that an image of a quality different from that which would be obtained when a single image alone is laid out on a single page will be printed. For example, if a monochrome image and a color image are laid out on one page, the image decided as that of the overall page is the color image and the portion that is the original monochrome image is processed as process black combined with a color component, as a result of which the image may be made gray in color. Further, if an image that has been printed on white paper and an image that has been printed on colored paper are scanned and laid out on one page, the image portion that was printed on the colored paper will still contain the under-color component.

SUMMARY OF THE INVENTION

Accordingly, an object of the present invention is to provide an image processing apparatus and method in which even if a plurality of read images are combined and output on one page, image processing that is to be performed page by page is executed for every page of a document that prevailed prior to combining, thereby making it possible to improve output image quality.

According to the present invention, the foregoing object is attained by providing an image processing apparatus for processing image data having attribute information for every pixel constituting the image data, comprising: a combining unit that combines component image data, which corresponds to each of a plurality of component images, into composite image data that corresponds to a single composite image; an attribute appending unit that appends identification information, which indicates the component image data to which each pixel belonged, as attribute information of pixels that constitute the composite image data; and a processing unit that applies common image processing to pixels having identical values as the identification information.

The present invention further provides an image reading apparatus comprising: a reader that reads a document image and generating image data; an image area separation processing unit that applying image area separation processing to the image data and appending attribute information pixel by pixel; and the above-described image processing apparatus for processing the image data to which the attribute information has been appended by the image area separation processing unit.

The present invention further provides an image reproducing apparatus comprising: the above-described image reading apparatus; and a reproducing unit that reproduces image data, which has been subjected to image processing by the image reading apparatus, as an image.

In accordance with the present invention, even if a plurality of read images are combined and output on one page, image processing that is to be performed page by page is executed for every page of a document that prevailed prior to combining, thereby making it possible to improve output image quality. Further, it is unnecessary for the apparatus to have extra page memory and it is possible to improve image quality while performance is maintained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 9 is a diagram illustrating an example of image-area flag of a PDL image;

FIG. 10 is a diagram illustrating an example of an image-area flag of a COPY image;

FIG. 11 is a diagram illustrating an example of flags that have been rewritten by an image-area flag conversion unit;

DETAILED DESCRIPTION OF THE PREFERRED EMBODIMENT

Configuration of Image Input/Output System

Figure 1:
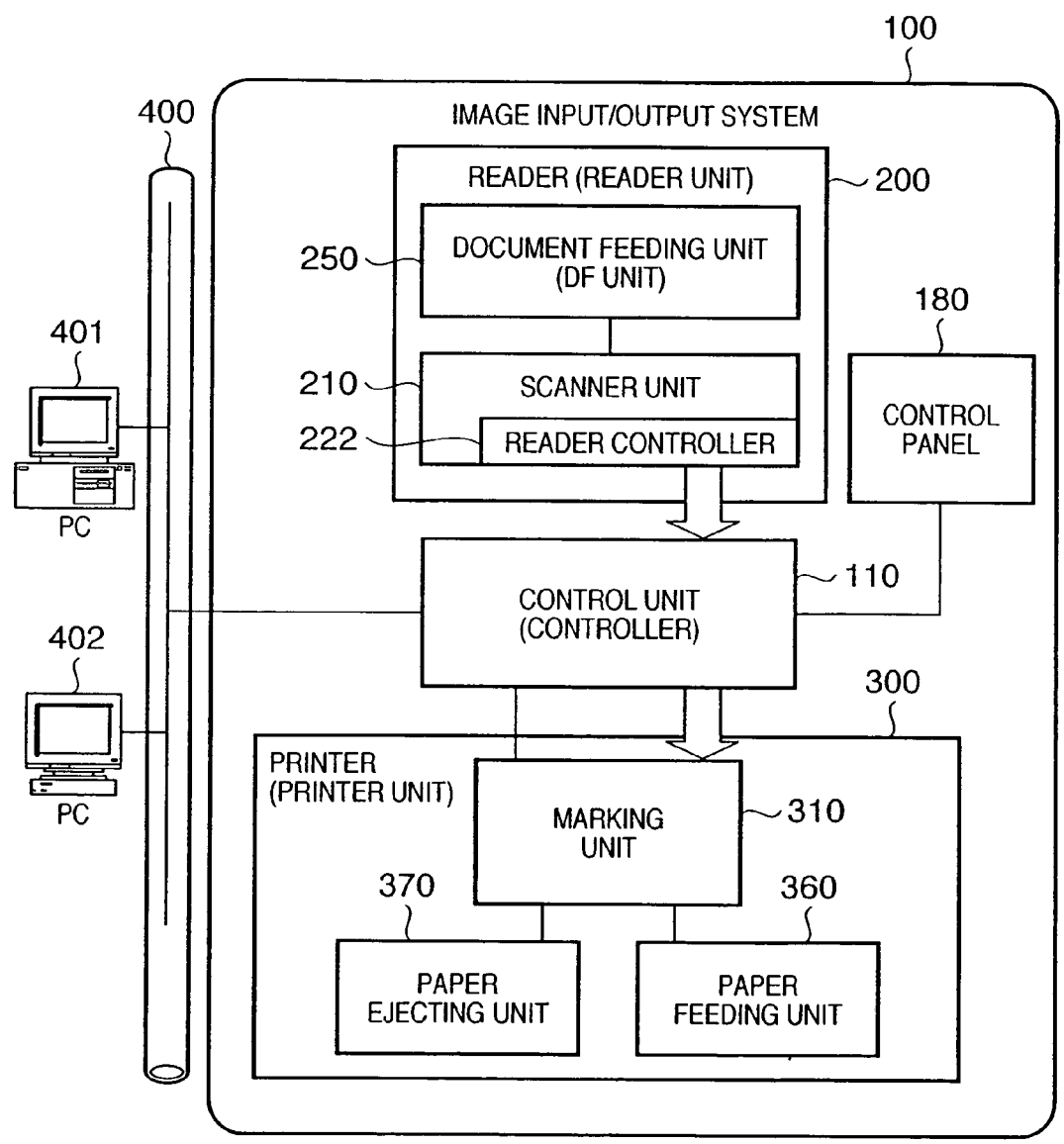
FIG. 1 is a block diagram illustrating the overall structure of an apparatus according to the present invention.

The overall configuration of an image input/output system 100 according to an embodiment of the present invention will now be described with reference to FIG. 1. The image input/output system 100 is implemented as a digital color copier, by way of example. A reader (image input unit) 200 reads a document image optically and converts it to image data. The reader 200 is constituted by a scanner unit 210 having a function for reading a document, and a document feeding unit 250 having a function for transporting document paper.

A printer (image output unit) 300 transports printing paper, prints image data on the paper as a visual image and ejects the paper to the exterior of the apparatus. The printer 300 comprises a paper feeding unit 360 having printing paper cassettes of a plurality of types; a marking unit 310 having a function for transferring image data to the printing paper and fixing the image; and a paper ejecting unit 370 having a function for sorting printing paper that has been printed on, stapling the paper and outputting the same to the exterior of the apparatus.

A control unit 110 is electrically connected to the reader 200 and printer 300 and is further connected to host computers 401, 402 via a network 400.

The control unit 110 controls the reader 200 to read in image data from a document, and controls the printer 300 to output the image data to printing paper, thereby providing a copy function. The control unit 110 further has a scanner function for converting read image data to code data and transmitting the code data to a host computer via the network 400, and a printer function for converting code data, which has been received from a host computer via the network 400, to image data and outputting the image data to the printer 300. A control panel 180, which is connected to the control unit 110 and is constituted by a liquid crystal touch-sensitive panel, provides a user interface for operating the image input/output system.

Figure 2:
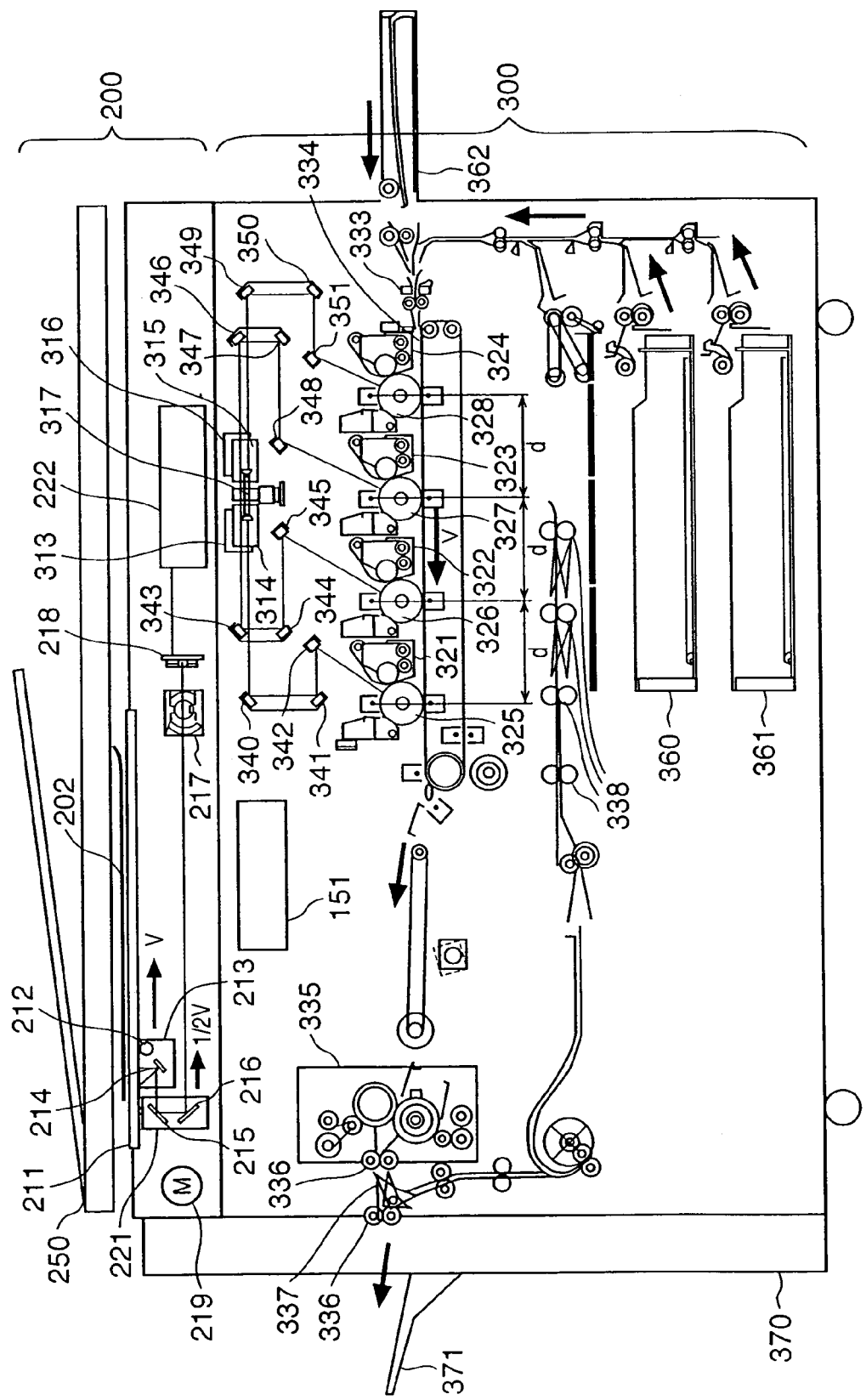
FIG. 2 is an overall view of a reader and printer of the apparatus.

FIG. 2 is an overall view of the reader 200 and printer 300. The document feeding unit 250 of the reader feeds documents to a platen glass 211 one sheet at a time in order starting from the leading document, and ejects the documents from the platen glass 211 after the document has been read. When a document is transported and placed on the platen glass 211, a lamp 212 is lit and an optics unit 213 is caused to start moving so that the document is exposed and scanned. Light reflected from the document at this time is introduced to a CCD (charge-coupled device) image sensor (referred to as a "CCD" below) 218 by mirrors 214, 215, 216 and a lens 217. Thus, the image of the scanned document is read by the CCD 218. A reader controller 222 applies prescribed processing to image data output from the CCD 218 and outputs the processed data to the control unit 110 via a scanner interface 140. A printer image processing circuit 151 outputs the image signal sent from the control unit 110 via a printer interface 145 to a laser driver 317 of the printer 300.

The laser driver 317 of the printer 300 drives laser emission units 313, 314, 315 and 316. The laser driver 317 causes the laser emission units 313, 314, 315 and 316 to emit laser light that conforms to the image data that has been output from a printer image processing unit 352. The laser light irradiates photosensitive drums 325, 326, 327 and 328 by mirrors 340, 341, 342, 343, 344, 345, 346, 347, 348, 349, 350 and 351 so that latent images conforming to the laser light are formed on the drums 325, 326, 327 and 328. Developing units 321, 322, 323 and 324 develop the latent images by toners of the colors black (Bk), yellow (Y), cyan (C) and magenta (M), respectively. The developed toner of each color is transferred to printing paper to obtain a full-color printout.

The printing paper is fed from a paper cassette 311 or 312 or from a manual-insertion tray at a timing synchronized to the start of irradiation by the laser light. The printing paper thus fed is attracted to a transfer belt 334 and transported via registration rollers 333. The developing agents that have become affixed to the photosensitive drums 325, 326, 327 and 328 are transferred to the printing paper. The printing paper to which the developing agents have been transferred is transported to a fixing unit 335, where the developing agents are fixed to the printing paper by heat and pressure supplied by the fixing unit 335. Upon passing through the fixing unit 335, the printing paper is ejected by ejection rollers 336. A paper discharge unit 370 gathers the discharged sheets of paper together, sorts the sheets and staples sheets that have been sorted.

If the apparatus has been set to a double-sided printing mode, the printing paper is transported up to the position of the ejection rollers 336, the rotating direction of the ejection rollers 336 is reversed and the paper is introduced to a paper re-feed path 338 by a flapper 337. Printing paper thus reintroduced to the paper re-feed path 338 is fed to the transfer belt 334 at the above-mentioned timing.

<Operation of Reader Controller 222>

Figure 4:
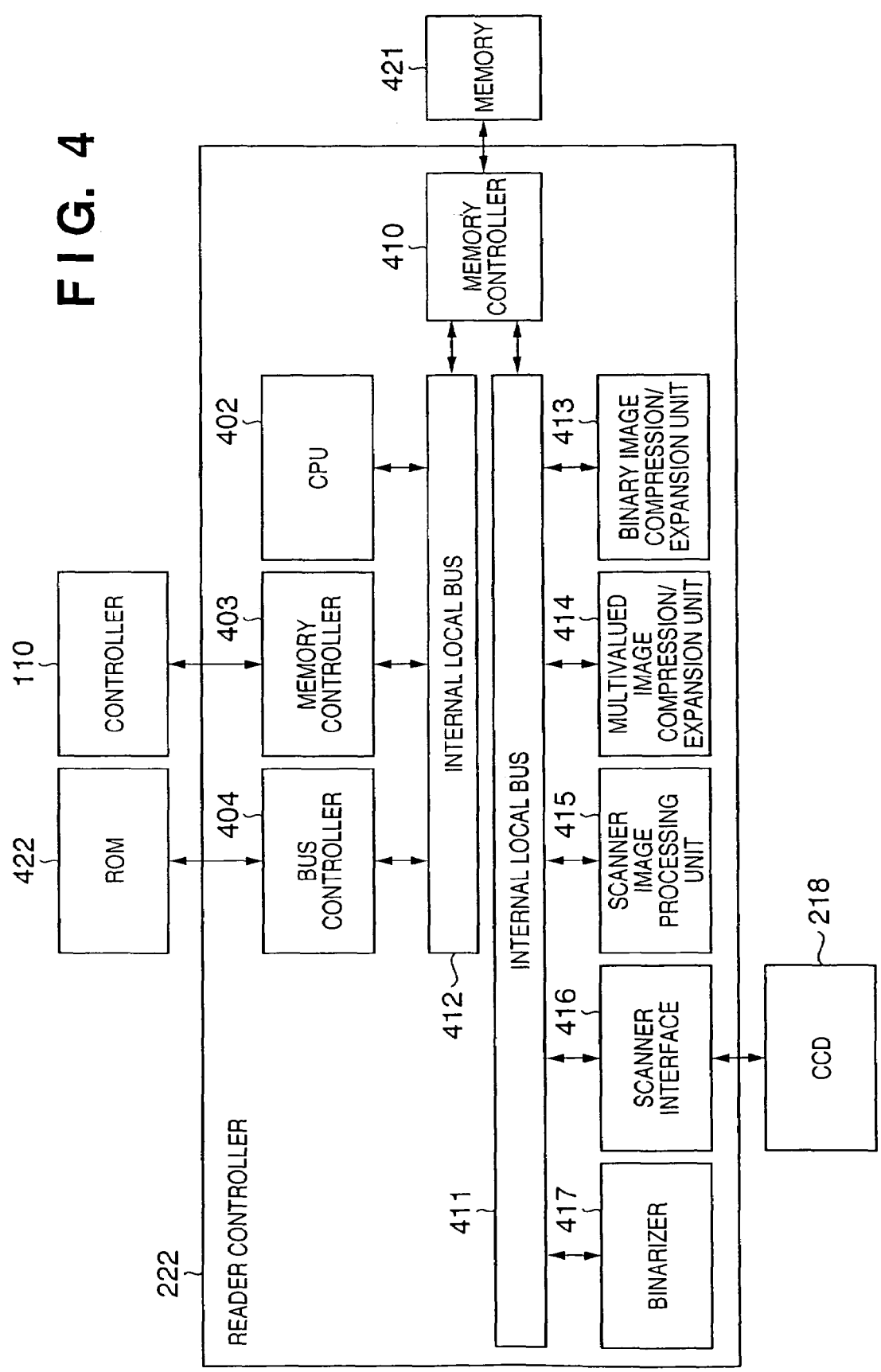
FIG. 4 is a block diagram illustrating a reader image processing unit.

FIG. 4 is a block diagram illustrating in detail the structure of the reader controller 222. A CPU 402 controls the reader controller 222, and a launching program is stored in a ROM 422. The CPU 402 operates based upon a program that has been stored in a memory 421. A high-speed serial bus controller 403 is connected to the controller 110 and transfers communication commands and image data. A USB (Universal Serial Bus) can be mentioned generally as the high-speed serial bus. A bus controller 404 connects a general-purpose external bus 423 and an internal local bus 412. Internal local buses 411, 412 connect each module of the reader controller and a memory controller 410 and transfer data.

In the reader controller 222, a document on the platen glass 211 is read by the CCD 218 and converted thereby to an electric signal. If the CCD 218 is a color sensor, then RGB color filters are placed in line on a one-line CCD in the order R, G, B. In the case of a three-line CCD, R, G, B color filters may be placed in a row for each of the CCDs. Further, the filters may be placed on a chip or may be arranged separately of the CCD. The electric signal (an analog image signal) that has entered the scanner interface is subjected to an analog-to-digital conversion so as to be converted to a digital signal of eight bits per R, G, B. The RGB 8-bit digital signal is input to the a scanner image processing unit 415, via a scanner interface 416, where it is subjected to prescribed processing, after which the resultant data is stored in the memory 421 via the local bus 411 and memory controller 410. The scanner image processing unit 415 outputs image data and an image-area flag (which corresponds to attribute information) that indicates a feature of the image data. Examples of image-area flags are a flag indicating character/non-character and a flag indicating a chromatic color/achromatic color.

Image data that has accumulated in the memory 421 is converted to compressed data using a multivalued image compression/expansion unit 414. JPEG compression can be mentioned generally as the compression scheme and is used in transferring a scanned image to the controller 110. When binary image data is transferred to the controller 110, multivalued data that has been read in is binarized by a binarizer 417 and is then subjected to binary image compression by a binary image compression/expansion unit 413. Examples of binary image compression schemes that can be mentioned generally are JBIG and MMR (Modified Modified Read). The image-area flag data that has been output by the scanner image processing is subjected to irreversible compression by the CPU 402 and is transferred to the controller 110 together with the image data. By way of example, Packbit or the like is used for compression of the image-area flag.

<Reader Image Processing Unit>

Figure 6:
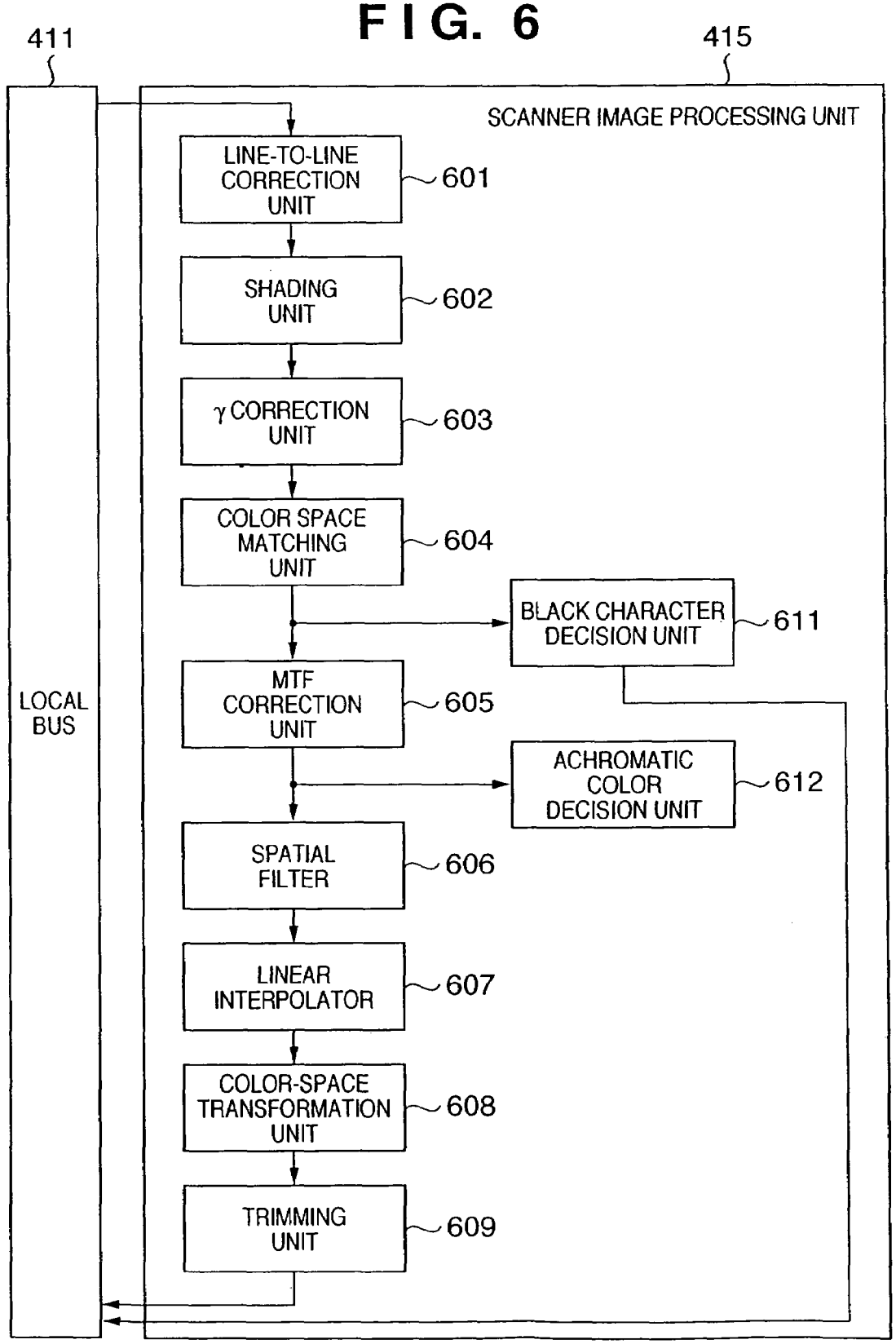
FIG. 6 is a block diagram of a section relating to image processing by a scanner interface.

FIG. 6 is a block diagram illustrating in detail the structure of the scanner image processing unit 415. A line-to-line correction unit 601 adjusts amount of delay line by line in accordance with reading speed and corrects the phase of RGB changed by the reading speed. If the CCD 218 is a three-line CCD, the line-to-line correction corrects signal timing in such a manner that the reading positions of the three lines will be the same. A shading unit 602 applies a shading correction and a black correction. The digital signal for which the reading position timing has been corrected is applied to a gamma correction unit 603, which subjects each of the R, G, B image signals to a one-dimensional non-linear conversion. A color-space matching unit 604 subjects the input RGB signal to a color correction using a three-dimensional LUT. An MTF (modulation transfer function) correction unit 605 corrects for a disparity in the MTF of each color of the input RGB signal on a per-component basis using data before and after data of interest. A spatial filter 606 performs a matrix calculation in order to adjust the sharpness of the input image. After an RGB→Lab color-space transformation has been performed, the luminance component is subject to a 7×7 operation. A linear interpolator 607 performs scaling for 50 to 200%. A color-space transformation unit 608 performs a color-space transformation from RGB to YUV in accordance with the operating mode. A trimming unit 609 executes border-removal processing and trimming/masking processing. Border-removal processing is used in document border removal, punch-hole removal and book border removal, etc.

An achromatic color decision unit 612 determines whether the entered image signal contains a chromatic color or not. Based upon the edge direction, etc., of the image signal, a black character decision unit 611 discriminates, pixel by pixel, a character/non-character area and chromatic color/achromatic color of the input image, creates an image-area flag that serves as the result of discrimination and transfers the flag to the memory 421. In order to render the black character decision, the black character decision unit 611 has a latch matrix for latching a group of pixels having a two-dimensional spread of N×N pixels, and a line buffer for delaying the image data (pixel data), which enters in raster order, by (N−1) lines in order to latch it in the latch matrix. The latched group of pixels is subjected to a matrix operation, which has been prepared beforehand for the purpose of image analysis, to thereby determine edge or area thickness. In order to render the edge decision, a Laplacian filter, for example, can be used to determine edge absence/presence and direction. As a result, an area in which an edge extends in one direction and has a width less than a certain width is judged to be a character or line drawing, and a flag indicating that this is a character is set as the image-area flag that is included in the image. With regard to the chromatic color/achromatic color flag, the ratio of each color component is found, for example, and if the ratio falls within a fixed range that serves as achromatic color, then the achromatic color flag is set. Thus, attribute information (an image-area flag) that includes a character/non-character flag and a chromatic color/achromatic color flag is appended to the image that has been scanned in.

<Control Unit>

Figure 3:
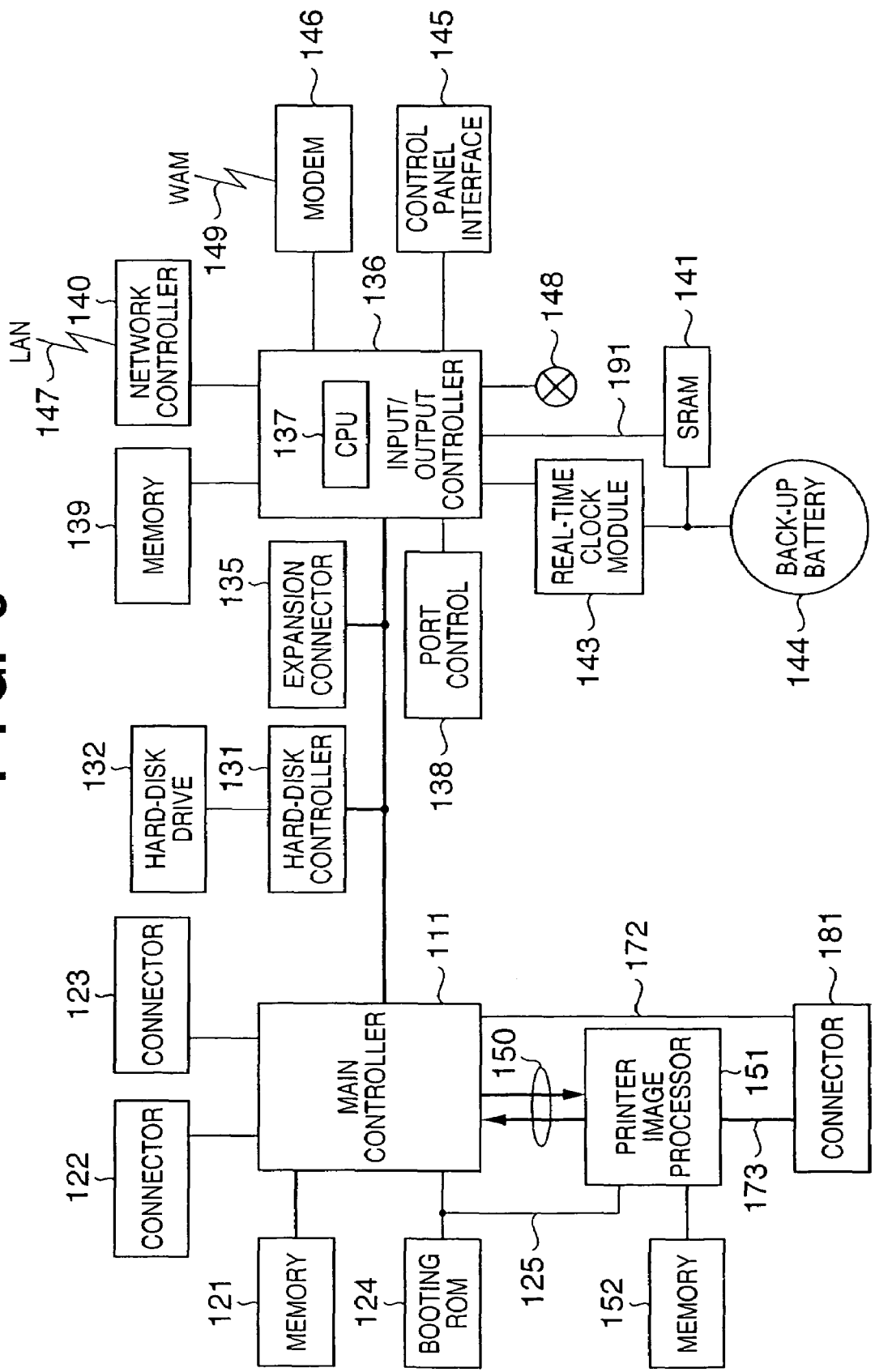
FIG. 3 is a block diagram illustrating a control unit of the apparatus.
Figure 5:
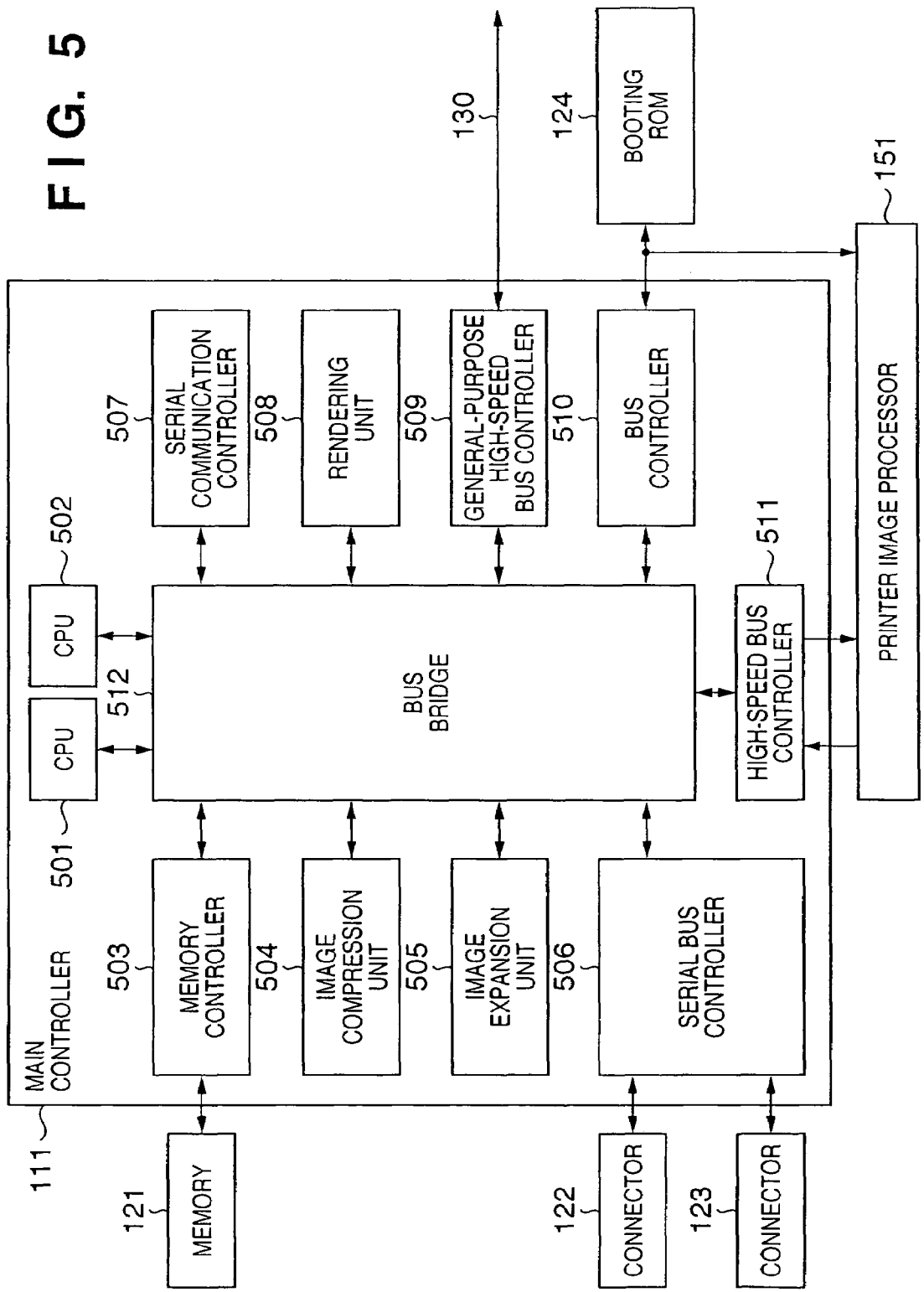
FIG. 5 is a block diagram of a main controller.

The functions of the control unit 110 will be described based upon the block diagram shown in FIG. 3. A main controller 111 will be described first. FIG. 5 is a block diagram illustrating the details of the main controller 111. A CPU 501 is a central processing unit that controls the operation of the overall control unit 110. The CPU 501 operates based upon a program that has been stored in a memory 121. Further, an operation for analyzing PDL (Page Description Language) code data received from a host computer and expanding the code data into raster image data also is described in this program. The interpretation of the code data is performed mainly by a CPU 502, and the expansion of the raster image data is performed by a rendering unit 508. The latter creates raster image data based upon code data that has been created by the CPU 502 and transfers the expanded raster data to the memory 121 and to a bus controller 510. Examples of the color space of the image data created by the rendering unit are RGB and CMYK.

A high-speed controller 511 controls the transfer of data input to and output from the printer image processor 151. The high-speed controller 511 controls arbitration at the time of bus contention and controls DMA (Direction Memory Access) data transfer. A serial communication controller 507 performs communication upon sending and receiving control commands to and from the CPU of the printer 300 via the serial bus. A serial bus controller 506 communicates with a host computer and communicates with various devices via a connector 122. A USB can be mentioned generally as the serial bus and is used as an interface for receiving PDL data from a host computer. The serial bus connected to the connector 123 is connected to the reader controller 222 and is used to communicate with the reader and to transfer image data.

A booting ROM 124 and the printer image processor 151 are connected to the bus controller 510 via a custom bus 125. The booting ROM 124 stores programs launched by the CPU 501 and, depending upon the case, stores font data for PDL. Further, raster image data that has been expanded by the rendering unit 508 is transferred from the main controller 111 to the printer image processor 151 via the bus controller 510. The custom bus 125 operates at low speed in the general-purpose bus mode when the booting ROM 124 is accessed, and operates at high speed in the custom bus mode when raster image data is transferred to the printer image processor 151. A general-purpose high-speed bus 130 is connected to a general-purpose high-speed bus controller 509, and an expansion connector 135 for connecting an expansion board is connected to an input/output controller 136 and hard-disk controller 131. A PCI bus can be mentioned generally as a general-purpose high-speed bus. An image compression unit 504 and an image expansion unit 505 function to perform compression and expansion of multivalued image data and, at the same time, a color-space transformation. The image compression, expansion and color-space transformation are used in making a color-space transformation to standard color space when image data that has been read in from the reader 200 is transferred to a host computer via a LAN 147 and the connector 122. A memory controller 503 controls access to the memory 121. A bus bridge 512 effects a bus connection to each of the modules within the main controller 111.

With reference again to FIG. 3, the hard-disk controller 131 is for connecting an external storage device. In this embodiment, a hard-disk drive 132 is connected via this interface. The hard-disk drive 132 is used in storing programs and image data. The input/output controller 136 controls a data bus 191 and exercises port and interrupt control. A CPU 137 is mounted on the input/output controller 136, exercises port control 138, controls the network controller 140 and controls communication with the control panel 180 and with a modem 146. The network controller 140 is connected to the external network 147. Ethernet (registered trademark) can be mentioned generally as the network and is used in receiving PDL data from a host computer, in transmitting a scanner image and in remote management. The modem 146 is connected to a public line 149 and performs facsimile communication. A memory 139 is used as the working memory of the CPU 137 and as a working memory for image data displayed on the control panel 180.

A control panel interface 145 comprises an interface for presenting a display on the liquid crystal screen of the control panel 180, and a key input interface for making inputs using hard keys and a touch-sensitive panel. The control panel 180 has a liquid crystal display area, a touch-sensitive panel input device affixed to the liquid crystal area, and a plurality of hard keys. A signal that has entered from the touch-sensitive panel or hard keys is transmitted to the CPU 137 via the control panel interface 145, and the liquid crystal display area displays image data that has been sent from the control panel interface 145. The liquid crystal display area presents a display of functions involved in operation of the image forming apparatus and displays image data, etc. A fan 148 is connected to the input/output controller 136 and is used to cool the controller 110. An SRAM 141, which is backed up by a back-up battery 144, stores user mode and various setting information as well as file management information of the hard-disk drive 132. A real-time clock module 143 updates and stores date and time managed within the apparatus and is backed up by the back-up battery 144.

The printer image processor 151 is connected to the main controller 111 by the custom bus 125 and a high-speed bus 150. The high-speed bus 150 is connected in loop form for unidirectional communication. The printer image processor 151 is connected to the printer 300 via a connector 181 and has a function for applying prescribed processing to image data that has entered from the main controller 111 and outputting the processed data to the main controller 111 or image forming unit 300. The memory 152 is used as a work area for the printer image processor 151 and as a delay buffer.

<Printer Image Processor>

Figure 7:
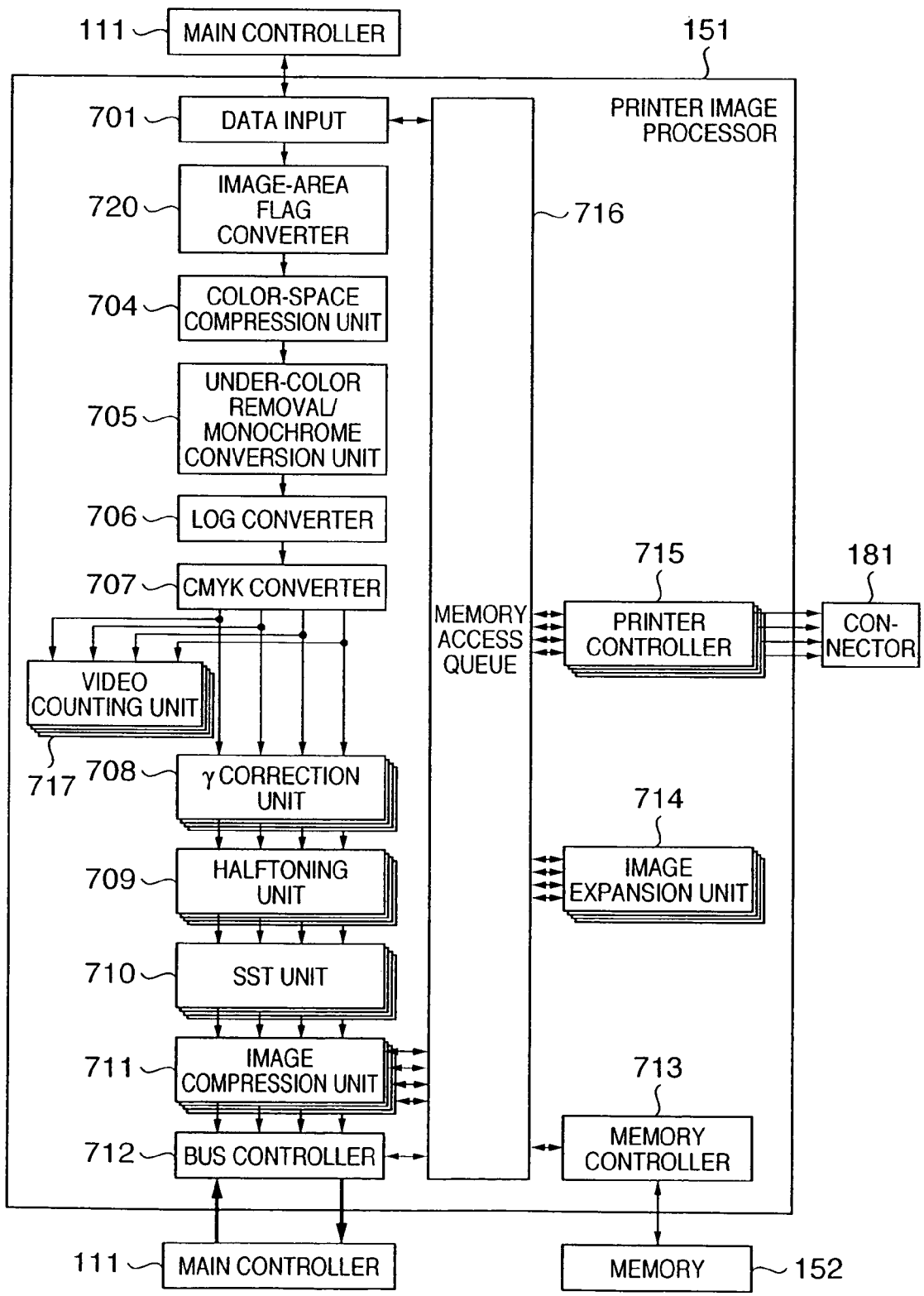
FIG. 7 is a block diagram of a section relating to image processing by a printer interface.

The printer image processor 151 that executes printer image processing will now be described in detail. FIG. 7 is a block diagram illustrating in detail the structure of the printer image processor 151. The image signal sent from the main controller 111 via the custom bus 125 is input first to a data input 701. The latter switches between the raster image data input and access to the memory 152 and, if raster image data has been input, transfers the input raster image data to an image-area flag converter 720. The latter converts the entered image-area flag in accordance with a prescribed setting. By way of example, the prescribed setting is performed by the control panel 180 via the control panel interface 145 connected to the input/output controller 136. The setting, which has been input by the operator, is stored in, e.g., the hard-disk drive 132 or memory 121 as information representing the content of the setting. An example of the setting content stored is a setting to the effect that a plurality of document images are to be combined and printed out on one page, and number of documents combined. Further, it is permissible to also input a setting to the effect that an automatic monochrome decision (monochrome conversion) or under-color removal is to be performed.

A color-space compression unit 704 subjects the entered image data to a matrix operation to perform color compression within the color reproducibility of the printer, a saturation adjustment, color-phase adjustment, under-color adjustment and black-area adjustment. Further, if the input color space is YUV, the color-space compression unit 704 effects a transformation to RGB color space. The color-space compression unit 704 has a function for changing over the calculation coefficients of the matrix operation depending upon the image-area flag. An under-color removal/monochrome conversion unit 705 and a function for subjecting the RGB image data to a non-linear operation to thereby remove the under-color of the image, a color/monochrome conversion function for converting the image data from RGB to monochrome if the image-area flag represents an achromatic color, and a function for changing over calculation coefficients by the image-area flag.

A LOG converter 706 applies a non-linear conversion using a one-dimensional look-up table, thereby converting the image data from an RGB signal to a CMY signal. A CMYK converter 707 converts the CMY signal to a CMYK signal using a three-dimensional look-up table. The CMYK converter 707 has a plurality of three-dimensional look-up tables and changes over the calculation coefficients by the image-area flag. It should be noted that in a case where the color space of the image data that has entered from the main controller 111 is CMYK, the entered data is output as is from the color-space compression unit 704 to the CMYK converter 707.

A gamma correction unit 708 adjusts the density of the entered CMYK signal independently for each color using a one-dimensional look-up table.

A halftoning unit 709 obtains 4/2/1-bit tones from the multivalued image data input thereto. The halftoning unit 709 uses an error-correction method and screen method as means for performing halftoning and changes over these methods by the setting of the image-area flag. For example, if text has been selected by a text/photograph changeover flag of the image-area flag, the halftoning unit 709 performs halftoning by the error-diffusion method. If photograph has been selected, then the halftoning unit 709 performs halftoning by the screen method. Further, several types of screens are provided and changeover of number of lines of the screens also is performed based upon the image-area flag. An SST unit 710 detects the edge of the image data by pattern matching, performs a conversion and smoothens the edge by reducing jaggies. A video counting unit 717 applies a gamma correction to the CMYK signal that has been output from the CMYK converter 707 and adds the signal value after the conversion. The result of addition is used in estimating the amount of toner consumption in the printer 300.

An image compression unit 711 irreversibly compresses the image data that has been output from the SST unit 710. In general, JBIG compression is used as the irreversible compression scheme. At the same time that the image compression unit 711 outputs compressed data to a bus controller 712, it stores uncompressed image data in the memory 152 via a memory access queue 716 and memory controller 713. The uncompressed image data that has been stored in the memory 152 is used when compressed data is replaced by uncompressed data in a case where the compression rate exceeds unity in the image compression unit 711.

The bus controller 712 transfers compressed/uncompressed image data, which has entered from the image compression unit 711, to the main controller. Further, the bus controller 712 serves to store image data, which has entered from the main controller, in the memory 152 and to perform register access of each module in the printer image processor 151.

An image expansion unit 714 expands the compressed data that has been stored in the memory 152 and stores the expanded image data in the memory 152 again. A printer controller 715 transfers the image data, which has been stored in the memory 152, to the printer 300 via the connector 181. The printer controller 715 has a memory for accumulating one line of image data and has a function for providing an inverted output. The printer controller 715 further has a border-removal function and a masking function.

The gamma correction unit 708, halftoning unit 709, SST unit 710, video counting unit 717, image compression unit 711, image expansion unit 714 and printer controller 715 have circuits in four channels in order to process the C, M, Y, K signals independently. The memory controller 713 controls access to the memory 152, and the memory access queue 716 changes over access to the memory 152 from the data input unit 701, image compression unit 711, bus controller 712, image expansion unit 714 and printer controller 715.

<Image-Area Flag Converter>

Figure 8:
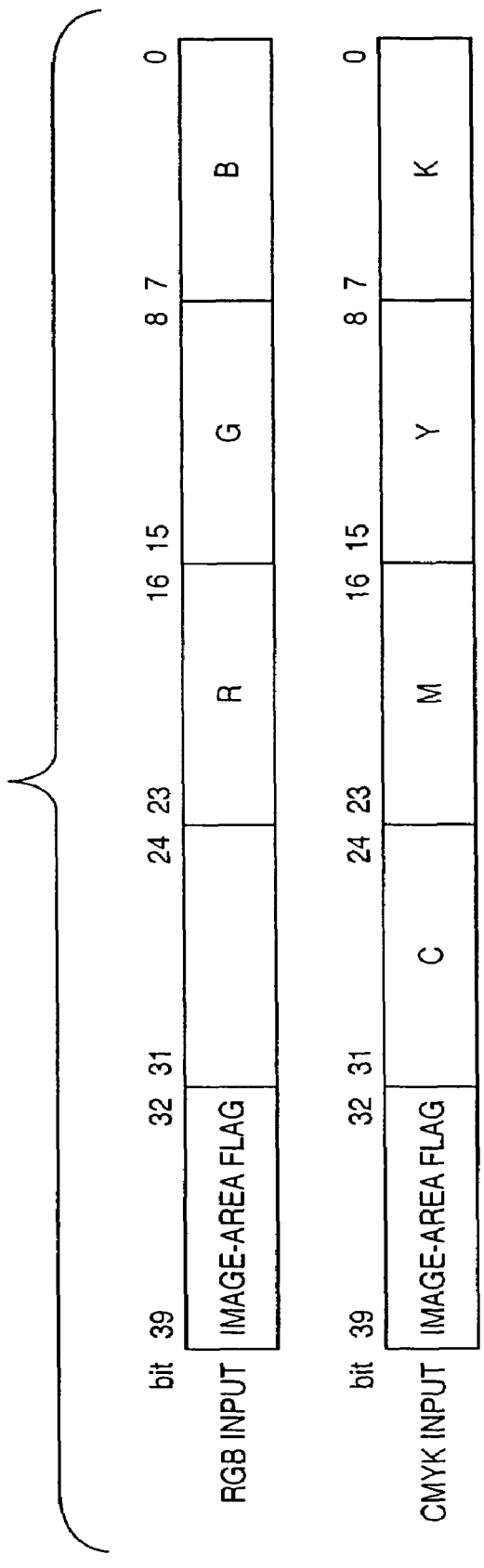
FIG. 8 is a diagram illustrating formats of image input to a printer image processing unit.

FIG. 8 illustrates RGB and CMYK input/output image formats of the image-area flag converter 720. The image-area flag is composed of eight bits, and the input image, in combination with the color data and image-area flag, is composed of 40 bits per pixel. The image-area flag is always situated in the eight higher-order bits. FIGS. 9 and 10 illustrate image-area flags appended to image data created by the rendering unit 508 and reader 200, respectively. In a case where a PDL image has been created by the rendering unit 508, bit 3 indicates a copy/PDL changeover flag, bit 2 an achromatic color flag, bit 1 a text/photograph changeover flag and bit 0 a vector flag. Bits 7 to 4 are reserved and fixed at "0". In a case where a copy image has been created by the reader 200, bit 3 indicates a copy/PDL changeover flag, bit 2 an achromatic color flag and bit 1 a text/photograph changeover flag. Bits 7 to 4 are reserved and fixed at "0".

FIG. 11 illustrates an example of result of output that has been converted by the image-area flag converter 720. The entered image-area flag is made the image-area flag that has been created by the reader 200. In FIG. 11, a read-in mode that prevailed when an image was read in by the reader 200 has been added to bit 5 of the image-area flag, and an image number in a case where images have been combined has been added to bits 7 to 6 of the image-area flag. The read-in mode is originally appended on a per-page basis. If the read-in mode is stored in association with every document image, therefore, it can be added to the image-area flag that conforms to the image data, as illustrated in FIG. 11. Further, when image data has been input to the image-area flag converter 720, the combining of document images will already have been completed. Accordingly, in order to append the image number, it will suffice to input setting information, which indicates whether several document images have been combined, from the main controller 111 to the image-area flag converter 720. If the number of combined images is one (meaning that images have not been combined), it will suffice if the image-area flag converter 720 makes all image numbers zero. If the number of combined-images is two, then the image is divided into two equal halves along the longitudinal direction and it will suffice if the image number of the pixels contained in one of these areas is made zero and the image number of the pixels contained in the other of these areas is made one. If the number of images is four or eight, then, in accordance with the layout of the document images after combining, common image numbers are appended to pixels that belong to areas that should have been contained in one document image, and a unique number is appended in the image obtained after combination. In the example of FIG. 11, there are only four image numbers, namely 0 to 3, and therefore only a maximum of four image numbers can be uniquely appended to document images. However, if the reserved fourth bit is used, eight images can be represented. If the $0^{th}$ bit is used, then 16 images can be represented.

Further, the result obtained by the achromatic color decision unit 612 of the reader 200 when the automatic color/monochrome document decision is rendered is reflected in the achromatic color changeover flag of bit 2.

Figure 12:
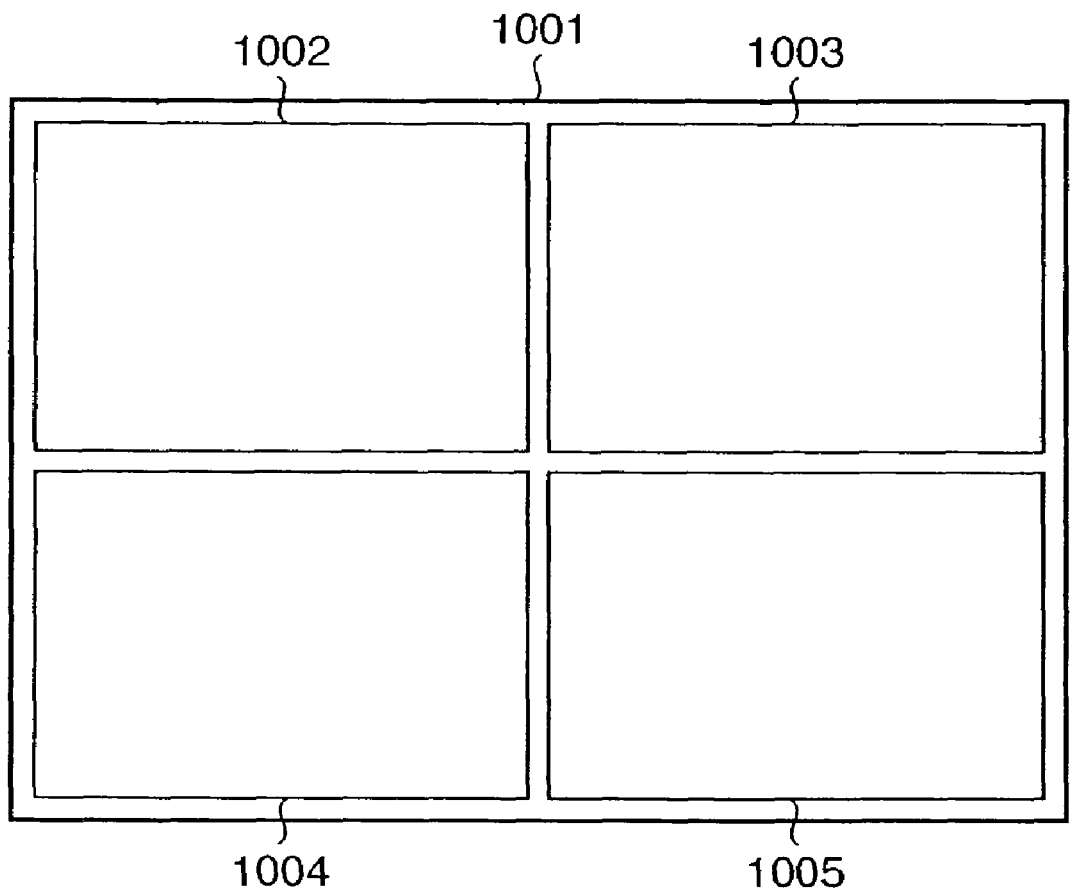
FIG. 12 is a diagram illustrating an example of areas in which image-area flags can be rewritten.

FIG. 12 illustrates an example of areas in which the image-area flag is changed over by the image-area flag converter 720. FIG. 12 shows an area 1001 which is the overall image, and reference numerals 1002 to 1005 denote the units for changing over the image-area flags. Any bit is rewritten to any data with regard to each of the areas 1002 to 1005. As one example, the areas 1002 to 1005 indicate page sizes when reduced images that have been read in by the reader 200 have been combined on one page. In a case where the reduced images (document images) have been laid out as shown in FIG. 12, image numbers 0, 1, 2, 3 are appended from left to right starting at the upper left. It will suffice if the order in which the document images are laid out is decided by the order of the documents that have been read in.

<Overview of Control Panel>

Figure 13:
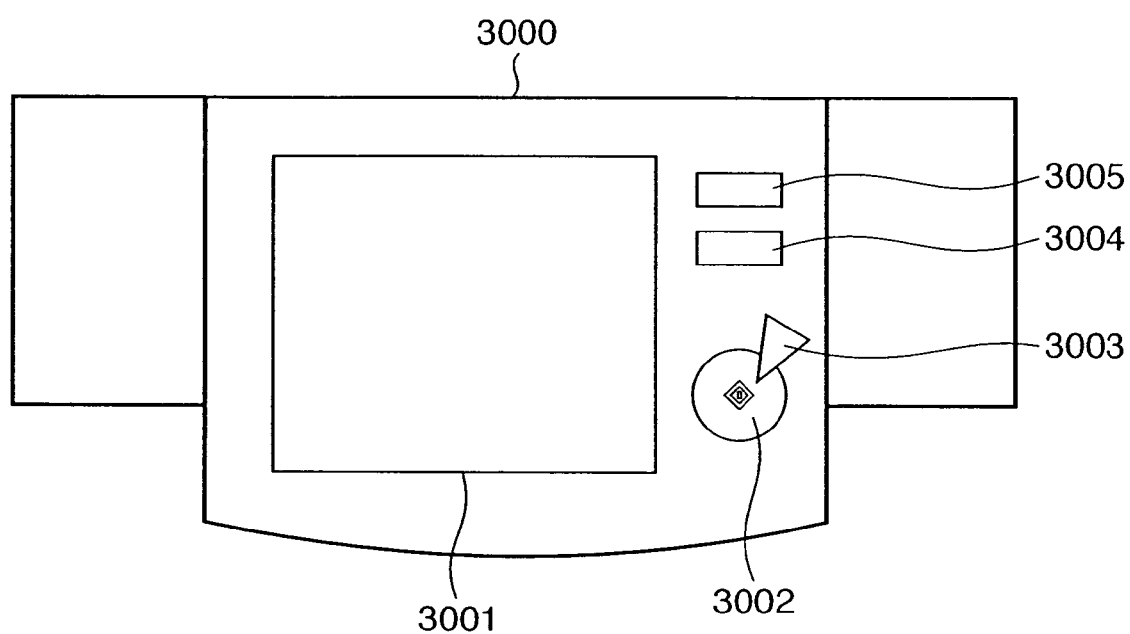
FIG. 13 is a diagram illustrating each screen of a control panel.

The structure of the control panel 180 is illustrated in FIG. 13. An LCD display unit 3001, which is obtained by affixing a touch-sensitive panel on an LCD, and displays the operating screen of the system. If any displayed key is pressed, information indicative of this position is sent to the controller CPU. A start key 3002 is used when an operation for reading a document image is to be started. A green and red two-color LED is placed at the center of the start key and indicates by its color whether the start key is in a usable state. A stop key 3003 is for halting an operation that is in progress. An ID key 3004 is used when a user ID (identifier) of a user is to be input. A reset key 3005 is used when initializing a setting from the control panel.

<Control Screen>

Figure 14:
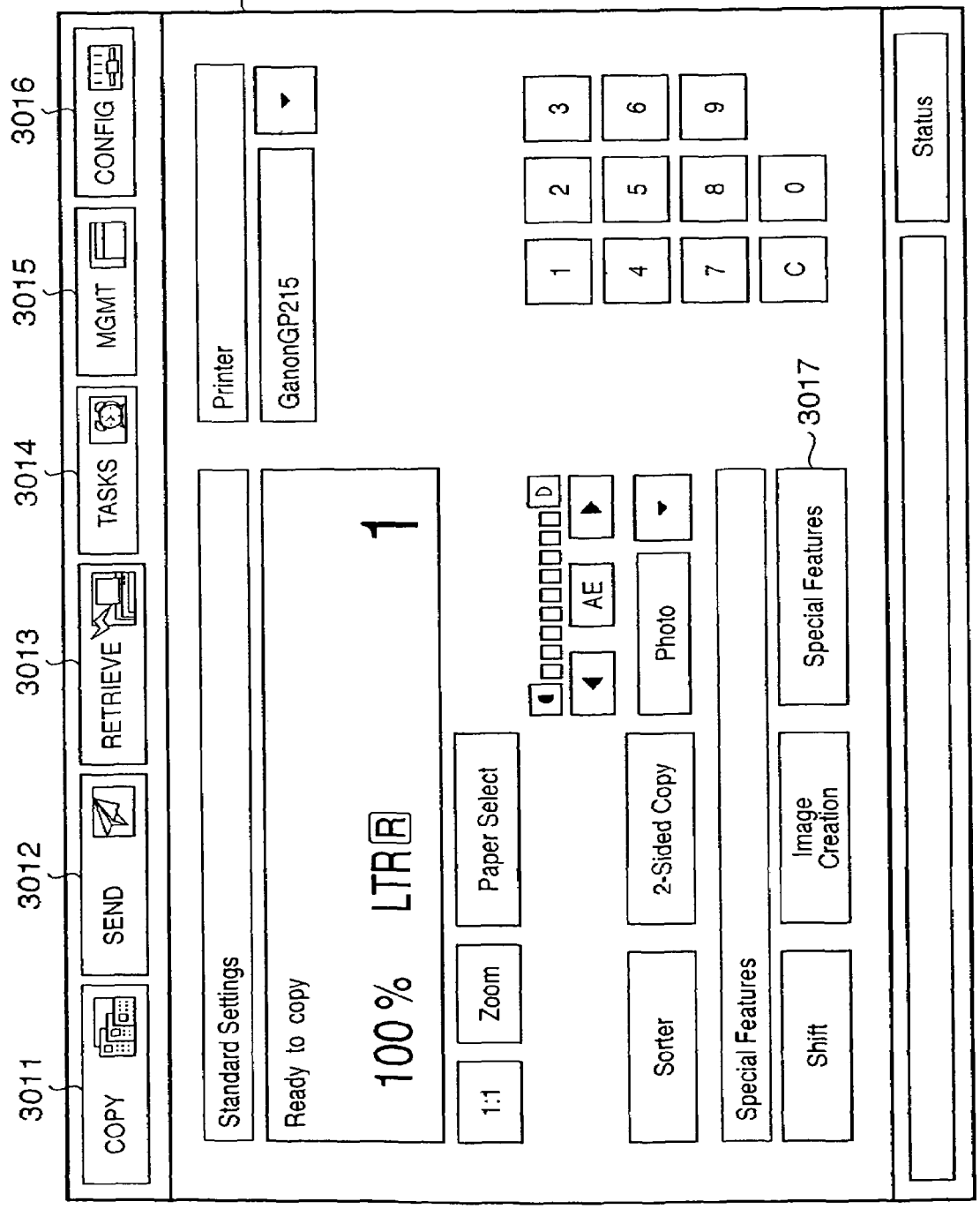
FIG. 14 is a diagram illustrating an example of a display presented on the control panel when a copy function is selected.

The functions provided by the apparatus of the present invention are divided into six major categories, namely copying, sending, retrieving, task, management and configuration. These functions correspond to six main tabs (COPY, SEND, RETRIEVE, TASKS, MGMT and CONFIG) (3011 to 3016) displayed at the top of the operating screen (screen 3010 in FIG. 14). By pressing any of these main tabs, a changeover is made to the screen of the particular category. In a case where changeover to another category is not allowed, the displayed color of the corresponding main tab changes and there is no response even if this main tab is pressed. If a special-feature button 3017 is pressed, a special-feature screen (not shown) is displayed. A reduced-size layout is capable of being designated as a copy setting on the special-feature screen. If the reduced-size layout has been designated, the number of pages of documents to be fit on one sheet of paper can also be designated. The designation of number of pages is performed by the operator who selects the images exemplifying the reduced-size layout of the kind shown in FIG. 4, by way of example. If the reduced-size layout has been selected, information indicating that "REDUCED-SIZE LAYOUT" has been designated and information indicating the number of document pages to be laid out on one sheet of paper is stored in memory 121, etc., as copy settings information.

If reduced-size layout has been set, processing for combining document images is executed. That is, the control panel 180 functions as designating means for allowing the operator to designate the combining of images.

The copy function includes a function for performing ordinary document copying using the scanner and printer possessed by the apparatus itself, and a function (remote copying) for performing document copying using the scanner possessed by the apparatus itself and a printer connected by a network. The send function is for transferring a document, which has been placed on the scanner possessed by the apparatus itself, to e-mail, a remote printer, facsimile, file transfer (FTP) and a database in a case where the copy function has been selected. It is possible to designate a plurality of destinations. The retrieve function is a function for acquiring an externally located document and printing the document by the printer possessed by the apparatus itself. The World-Wide Web, e-mail, file transfer and facsimile can be used as the document acquisition means. The task function performs task generation and management for automatically processing a document sent from a facsimile or from the outside such as Internet print and performing retrieval periodically. The management function performs management of jobs, an address directory, bookmarks, documents and account information. The configuration function performs settings (network, clock, etc.) relating to the apparatus itself. In the copy mode, the combining of document images is performed and settings for monochrome decision (conversion) processing and under-color removal processing are made (this is not illustrated in FIG. 13).

<Sequence at Time of Copy Image Output>

Figure 15:
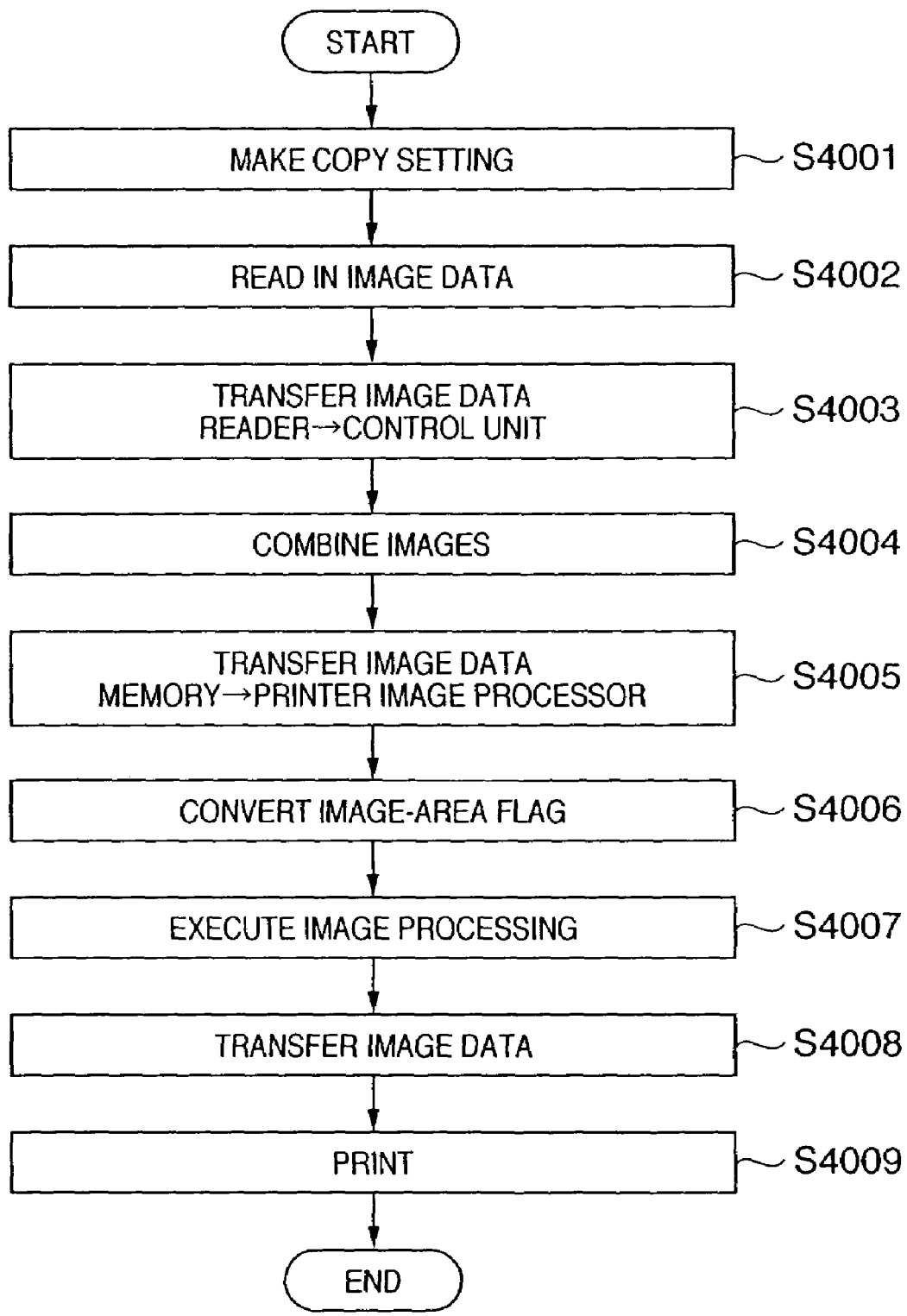
FIG. 15 is a flowchart illustrating image processing executed by this apparatus.

FIG. 15 is a flowchart illustrating the procedure for outputting a copy image in this embodiment. In FIG. 15, S4001 to S4009 are step numbers. The procedure shown in FIG. 15 indicates the flow of processing of the overall apparatus shown in FIG. 1.

If a copy image is to be output, the user operates the control panel 180 to perform a copy setting for the job of the copy image output at step S4001 in FIG. 15. The content of the copy setting is number of copies, paper size, single or double-sided printing, enlargement/reduction, sorted output and whether stapling is to be performed, etc. This information is stored in the memory 121, etc.

If the operator applies a copy start command using the control panel 180, the main controller 111 of the control unit 110 controls the reader 200 via the connector 122 and performs an operation for reading in the image of the document at step S4002. First, the document feeding unit 250 feeds documents, which have been placed in the unit, to the platen glass 211 one sheet at a time and senses the size of the document at the same time. By exposing and scanning the documents based upon the document size sensed, image data is read. In a case where scaling processing is executed, image data is read from the CCD at 1× magnification (100%) and the linear interpolator 607 of the scanner image processing unit 415 executes scaling processing in accordance with the enlargement/reduction setting. The image data that has been read is stored temporarily in the memory 421 as image data and an image-area flag, and the multivalued image compression/expansion unit 414 and CPU 402 subject each of these to compression processing and store the results in the memory 421.

The data in the memory 421 is transferred to the memory 121 of control unit 110 at step S4003. The data transferred to the control unit 110 is compressed image data and a compressed image-area flag, by way of example. The combining of images is performed by the control unit 110 in accordance with the content of the copy settings information. That is, if the reduced-size layout has been designated, the reduction ratio is decided based upon output paper size and the number of pages of documents to be combined. It will suffice if the relationship among output paper size, number of pages of documents to be combined and reduction ratio is provided in a ROM or the like beforehand in the form of a table representing the relationship, by way of example. Document images that have been reduced are combined in the designated layout and then are output. That is, in the combining of images, the read document images are reduced in size in accordance with the number of images to be combined and the output size, and two, four or eight of the size-reduced images are arranged and converted to one page of image data. Of course, the number of pages that may be reduced and laid out on one sheet of paper is not limited to two, four or eight and other choices may be provided. That is, the control unit 110 functions as combining means for combining a plurality of reduced images (namely component images) into a single image.

At step S4005, the compressed image data in memory 121 is expanded into a raster image by the image expansion unit 505 and the raster image is transferred to the printer image processor 151 via the bus controller 510 together with the image-area flag data that has been expanded by the CPU 501. Settings information, namely a setting to the effect that document images are to be combined and the number of images to be combined, is included as the information transferred.

Next, at step S4006, the image-area flag converter 720 of the printer image processor 151 rewrites the entered image-area flag data in accordance with the settings information. The content that undergoes rewriting is the image number and the result of the automatic color/monochrome decision. In this embodiment, the content is assumed to be image number and mode changeover (see FIG. 11). If the result of the achromatic color decision in the scanner image processing unit 415 is that the achromatic color changeover flag has been set pixel by pixel, as shown in FIGS. 6 and 10, then nothing in particular need be rewritten. That is, the image-area flag converter 720 functions as attribute appending means for appending identification information, which indicates component image data to which each pixel constituting the combined image data belongs, as attribute information of each pixel.

Figure 16:
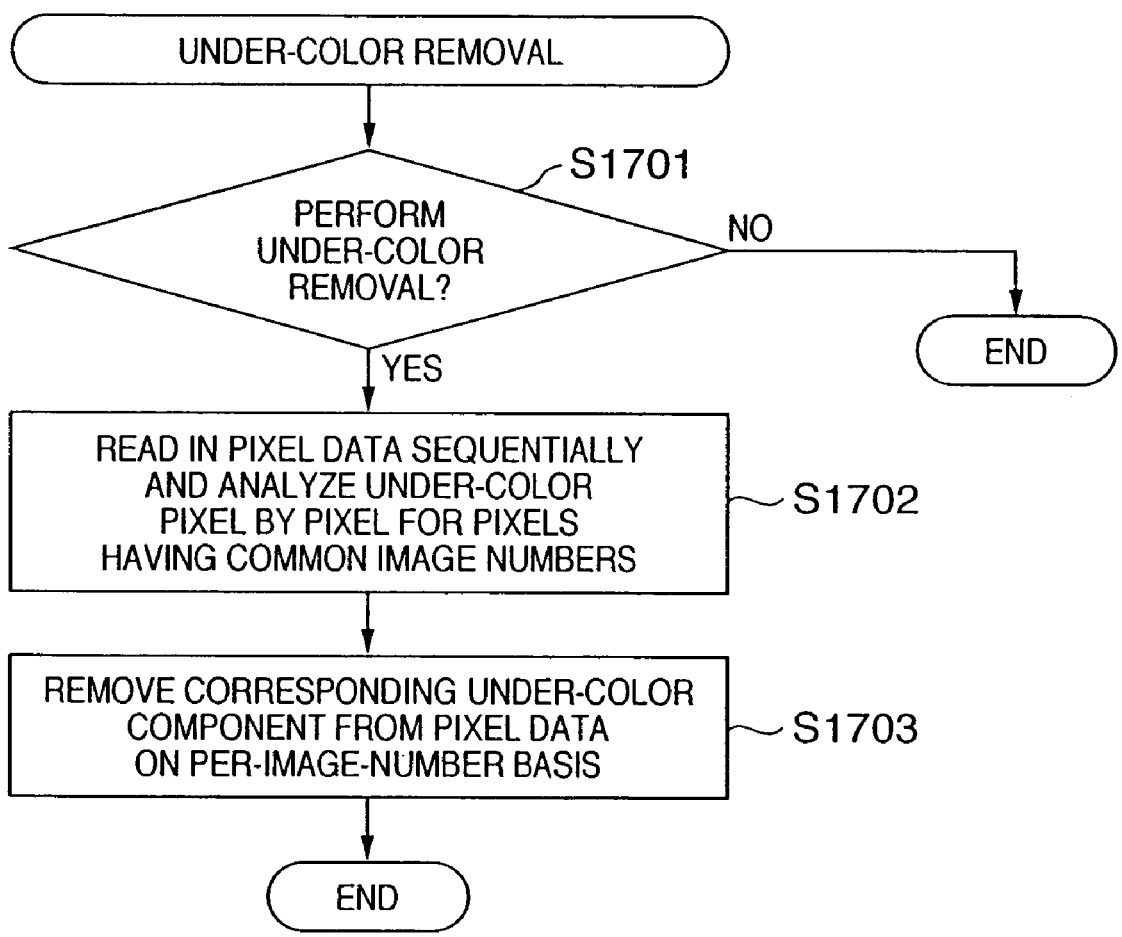
FIG. 16 is a flowchart illustrating an example of under-color removal processing.
Figure 17:
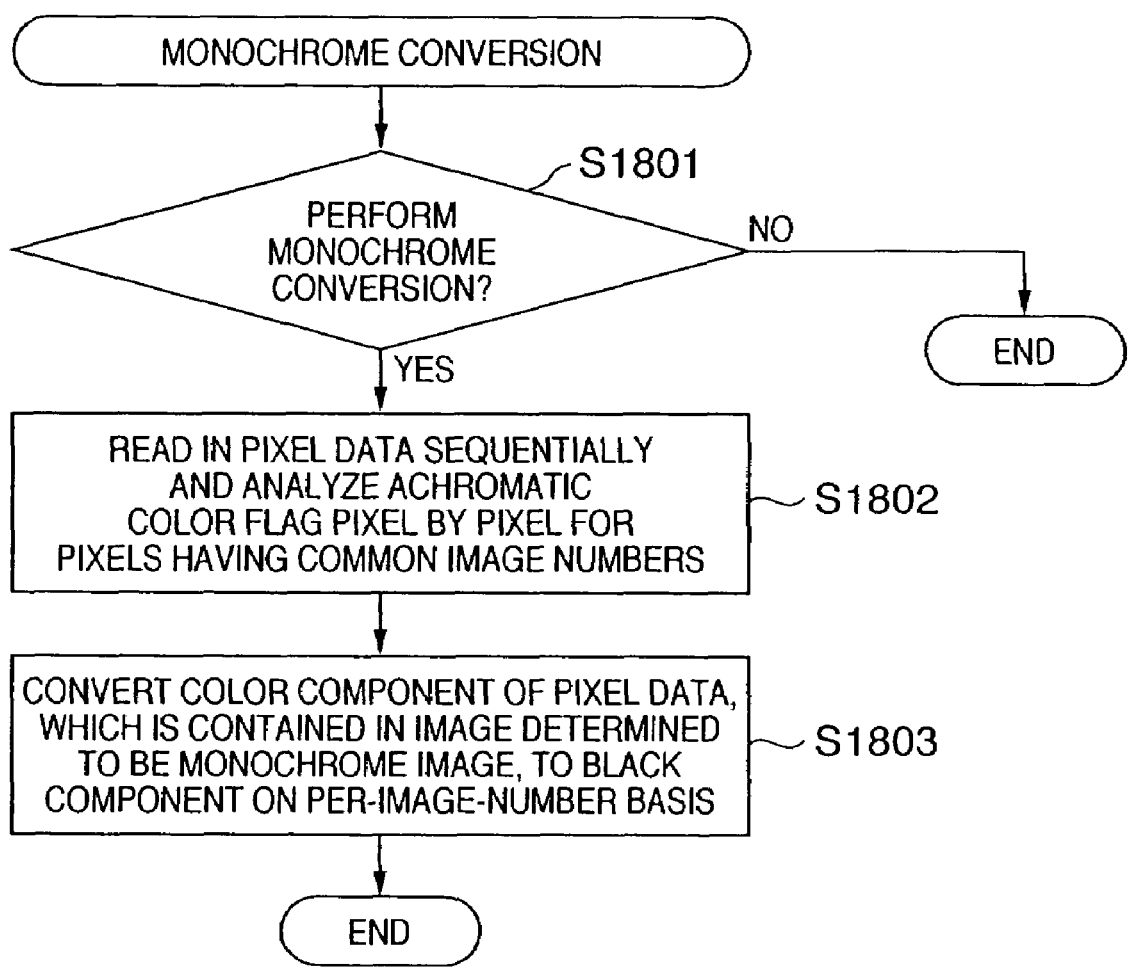
FIG. 17 is a flowchart illustrating an example of monochrome conversion processing.

Next, at step S4007, a halftone image is created by subjecting the raster image data to image processing in the processing blocks 704 to 710 of FIG. 7 while reference is had to the image-area flag data. An example of the processing is illustrated in FIGS. 16 and 17. As shown in FIGS. 16 and 17, the processing blocks 704 to 710 function as processing means for applying common processing to pixels having identical values as identification information.

The halftone image is stored in the memory 152 via the image compression unit 711 at step S4008. The image compression unit 711 does not execute image compression at this time.

The image data that has accumulated in the memory 152 is synchronized to a control signal from the printer 300 and the image data is printed out from the printer controller 715 at step S4009. The control signals of each of C, M, Y, K that enter from the printer 300 are input upon being staggered in conformity with the positions of the photosensitive drums 325, 326, 327, 328, and the amount of this shift for every color component from drum to drum is absorbed by the memory 152.

When the transfer of image data is completed, i.e., when the copy job ends, the printout operation is terminated.

An example of processing that can be executed at step S4007 is illustrated in FIGS. 16 and 17. FIG. 16 illustrates an example of under-color removal processing executed by the under-color removal/monochrome conversion unit 705 of FIG. 7. First, the unit 705 determines whether under-color removal has been set by the setting (S1701). If under-color removal has been set, then the unit 705 reads in the pixel data raster sequentially, gathers together groups of pixels having common image numbers as attribute information (image-area flags), discriminates under-color and stores the results of discrimination in association with the image numbers (step S1702). An example of a conceivable method of performing the under-color decision is as follows: If a certain color is distributed over a fixed range and this range is within a number of images greater than a fixed number (an area having common image numbers), then it is decided that this color is an under-color. Other methods commonly employed can also be adopted as a matter of course. From the pixel data having each image number as an image-area flag, the unit 705 removes the component of the under-color that has been obtained with regard to the corresponding image number (S1703). By following this procedure, the common under-color is removed per area corresponding to each image number, i.e., for every document image before combination, thereby making it possible to realize processing on a per-document-image basis.

FIG. 17 illustrates an example of monochrome conversion processing executed by the under-color removal/monochrome conversion unit 705 of FIG. 7. First, the unit 705 determines whether monochrome conversion has been set by the setting (S1801). If monochrome conversion has been set, then the unit 705 reads in the pixel data raster sequentially, gathers together groups of pixels having common image numbers as attribute information (image-area flags), determines whether the pixels are achromatic and stores the results of this determination in association with the image numbers (step S1802). An example of a conceivable method of performing the achromatic color decision is as follows: If pixels having color components that belong to a range of achromatic color are distributed over an entire area having a common image number, then it is decided that this entire area is achromatic. Other methods commonly employed can also be adopted as a matter of course. If, with regard to pixel data having each image number as a image-area flag, the result of the achromatic color decision rendered with regard to the corresponding image number is that the color is achromatic, then each color component is converted to the monochromatic color black (S1803). By following this procedure, the monochrome conversion is performed per area corresponding to each image number, i.e., for every document image before combination, thereby making it possible to realize processing on a per-document-image basis.

Thus, the image input/output system of this embodiment is such that image data after combination can be subjected to image processing that conforms to the features of each document image that prevailed before it was combined. As a result, it is unnecessary for the apparatus to have extra page memory and it is possible to improve image quality while performance is maintained.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-309874 filed on Oct. 25, 2004, which is hereby incorporated by reference herein.

What is claimed is:

1. An image processing apparatus comprising:
   an inputting unit that inputs a plurality of component images, each of which comprises a plurality of pixels, the pixels having attribute information which indicates whether the pixels are achromatic or not;
   a combining unit that combines the plurality of component images into a composite image, the attribute information of the pixels of the plurality of component images being combined into attribute information of the composite image;
   an attribute appending unit that appends an identification number to the attribute information of each of the pixels, the identification number indicating which of the component images each of the pixels having the identification number belongs to;
   an analyzing unit that analyzes, for the pixels which have a common identification number together, the attribute information of the pixels of the composite image to determine whether the pixels which have the common identification number are achromatic or not; and
   a processing unit that converts a color component of the pixels which are determined to be achromatic into a black monochromatic color.

2. An image processing method comprising:
   an inputting step of inputting a plurality of component images, each of which comprises a plurality of pixels, the pixels having attribute information which indicates whether the pixels are achromatic or not;
   a combining step of combining the plurality of component images into a composite image, the attribute information of the pixels of the plurality of component images being combined into attribute information of the composite image;
   an attribute appending step of appending an identification number to the attribute information of each of the pixels, the identification number indicating which of the component images each of the pixels having the identification number belongs to;
   an analyzing step of analyzing, for the pixels which have a common identification number together, the attribute information of the pixels of the composite image to determine whether the pixels which have the common identification number are achromatic or not; and
   a processing step of converting a color component of the pixels which are determined to be achromatic into a black monochromatic color.

3. A program recorded on a computer-readable recording medium to be executed by a computer to perform an image processing method, said method comprising:
   an inputting step of inputting a plurality of component images each of which comprises a plurality of pixels, the pixels having attribute information which indicates whether the pixels are achromatic or not;
   a combining step of combining the plurality of component images into a composite image, the attribute information of the pixels of the plurality of component images being combined into attribute information of the composite image;
   an attribute appending step of appending an identification number to the attribute information of each of the pixels, the identification number indicating which of the component images each of the pixels having the identification number belongs to;
   an analyzing step of analyzing, for the pixels which have a common identification number together, the attribute information of the pixels of the composite image to determine whether the pixels which have the common identification number are achromatic or not; and
   a processing step of converting a color component of the pixels which are determined to be achromatic into a black monochromatic color.

4. The apparatus according to claim 1, further comprising:
   a designation unit that inputs a number of the component images to be combined,
   wherein the combining unit combines the plurality of component images according to the number of the component images, and
   wherein the attribute appending unit appends the identification number to the attribute information of each of the pixels according to the number of the component images.

5. The apparatus according to claim 1, wherein the input unit includes an image scanner and the attribute information is attached to the pixels in accordance with a scanning operation in the image scanner.

6. The apparatus according to claim 1, wherein the attribute information of each of the pixels further indicates whether the pixels are under-color or not,
   the analyzing unit analyzes, for the pixels which have a common indication number together, the attribute information of the composite image to determine whether the pixels which have the common identification number are under-color or not; and
   the processing unit removes the under-color of the pixels which are determined to be under-color.

7. The apparatus according to claim 1, wherein each of the pixels comprises color data as well as the attribute information.

8. The method according to claim 2, further comprising the steps of:
   inputting a number of the component images to be combined, wherein, in the combining step, the plurality of component images are combined according to the number of the component images, and wherein, in the attribute appending step, the identification number is appended to the attribute information of each of the pixels according to the number of the component images.

9. The program according to claim 3, wherein the method further comprising the steps of:

inputting a number of the component images to be combined, wherein, in the combining step, the plurality of component images are combined according to the number of the component images, and wherein, in the attribute appending step, the identification number is appended to the attribute information of each of the pixels according to the number of the component images.

\* \* \* \* \*